US008935839B2

(12) United States Patent
Burt

(10) Patent No.: US 8,935,839 B2
(45) Date of Patent: Jan. 20, 2015

(54) BALLISTIC ENHANCED BATTERING RAM

(75) Inventor: Owen Vernon Burt, Langley, WA (US)

(73) Assignee: Owen V. Burt, Spokane, WA (US)

( * ) Notice: Subject to any disclaimer, the term of this patent is extended or adjusted under 35 U.S.C. 154(b) by 626 days.

(21) Appl. No.: 13/026,214

(22) Filed: Feb. 12, 2011

(65) Prior Publication Data

US 2011/0203090 A1 Aug. 25, 2011

Related U.S. Application Data

(60) Provisional application No. 61/306,320, filed on Feb. 19, 2010.

(51) Int. Cl.
*B23P 19/04* (2006.01)
*B25D 11/00* (2006.01)
*A62B 3/00* (2006.01)

(52) U.S. Cl.
USPC .............................. 29/254; 173/90; 254/93 R

(58) Field of Classification Search
USPC ......... 29/254; 254/93 R, 133 R; 269/65, 3, 6; 173/90, 112, 206, 200; 227/9, 10
See application file for complete search history.

(56) References Cited

U.S. PATENT DOCUMENTS

| | | | | |
|---|---|---|---|---|
| 4,681,171 | A | 7/1987 | Kee | |
| 4,850,437 | A | 7/1989 | Sudnishnikov | |
| 5,067,237 | A | 11/1991 | Holder | |
| 5,088,174 | A | 2/1992 | Hull | |
| 5,177,850 | A | 1/1993 | Hull | |
| 5,196,647 | A | 3/1993 | Majors | |
| 5,329,685 | A | 7/1994 | Gillespie | |
| 5,398,773 | A | 3/1995 | Baker | |
| 5,415,241 | A | 5/1995 | Ruffu | |
| 6,035,946 | A | 3/2000 | Studley | |
| 7,305,788 | B1 | 12/2007 | McLain | |
| 2007/0261870 | A1 | 11/2007 | Milone | |
| 2009/0133597 | A1 | 5/2009 | Moore | |
| 2009/0199613 | A1 * | 8/2009 | Krumrei | 72/446 |
| 2010/0077585 | A1 | 4/2010 | Prine | |

* cited by examiner

*Primary Examiner* — Lee D Wilson
*Assistant Examiner* — Seahee Yoon

(57) ABSTRACT

A ballistic battering ram device that uses gun powder to produce a striking force. The ballistic battering ram includes a hollow casing, a bolt piston housing housed within the hollow casing, a bolt housed within the bolt piston housing and configured to slide back and forth, and a firing pin attached to the bolt and configured to strike the primer on the explosive casing. When the user strikes the door with the ballistic battering ram a front plate makes contact with the door pushing the bolt piston housing towards a chamber piston. Simultaneously, a retention pin timing spring pushes against a retention pin withdrawing the retention pin from inside the hollow casing. This action may allow the chamber piston to move backwards after firing which may be important for recoil management.

8 Claims, 2 Drawing Sheets

BALLISTIC ENHANCED BATTERING RAM

CROSS REFERENCE TO RELATED APPLICATIONS

This application claims the benefit of priority to U.S. Provisional Application No. 61/306,320 filed Feb. 19, 2010, the contents of which are incorporated herein by reference.

BACKGROUND OF THE INVENTION

The present invention generally relates to a battering ram device for providing a forced entry into a room. More specifically, the present invention relates to a ballistic enhanced battering ram that uses gun powder to produce a striking force.

Currently, law enforcement personnel and firemen use battering rams to forcibly enter locked rooms. Some are hand held devices requiring users to swing the battering rams which sometimes result in the user(s) repeatedly striking the door with the battering ram in order to gain entry into the locked room. Having to strike the door several times delays the entry into the locked room, which may allow a criminal to escape, hide evidence, harm hostages, or fire at the law enforcement personnel. In case of a fire, delaying the entry into the locked room, may allow the fire to get out of control. Other battering rams have been conceived to use a pneumatic piston to enhance their power but lack any measures to counteract the recoil that would result from the force necessary to open a secured door.

As can be seen, there is a need for a battering ram device that strikes down a door quickly in order to gain access into a locked room.

SUMMARY OF THE INVENTION

In one aspect of the present invention, a ballistic battering ram includes a hollow casing, a bolt piston housing housed within the hollow casing, a bolt housed within the bolt piston housing and configured to slide back and forth, and a bolt timing spring attached to the bolt and configured to push the bolt forward from a default position prior to operation of the invention.

In one aspect of the present invention, a ballistic battering ram includes a hollow casing, a bolt piston housing sliding inside the hollow casing, a front plate connected to the bolt piston housing, a back plate connected to the back of the hollow casing, a first and second handle attached to the outer side of the hollow casing, chamber piston placed inside of the hollow casing configured to slide backwards upon ignition of the explosive casing, a bolt retention pin placed inside the bolt piston housing, a bolt connected to the first side of the bolt retention pin, a bolt timing spring connected to the second side of the bolt retention pin, an explosive casing connected to attached to the chamber, the explosive casing is adapted to receive gun powder, and a firing pin connected to the bolt configured to trigger an explosion of the gun powder and propel the chamber piston toward the front plate.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a battering ram device that uses gun powder to produce a striking force.

Figure 1:
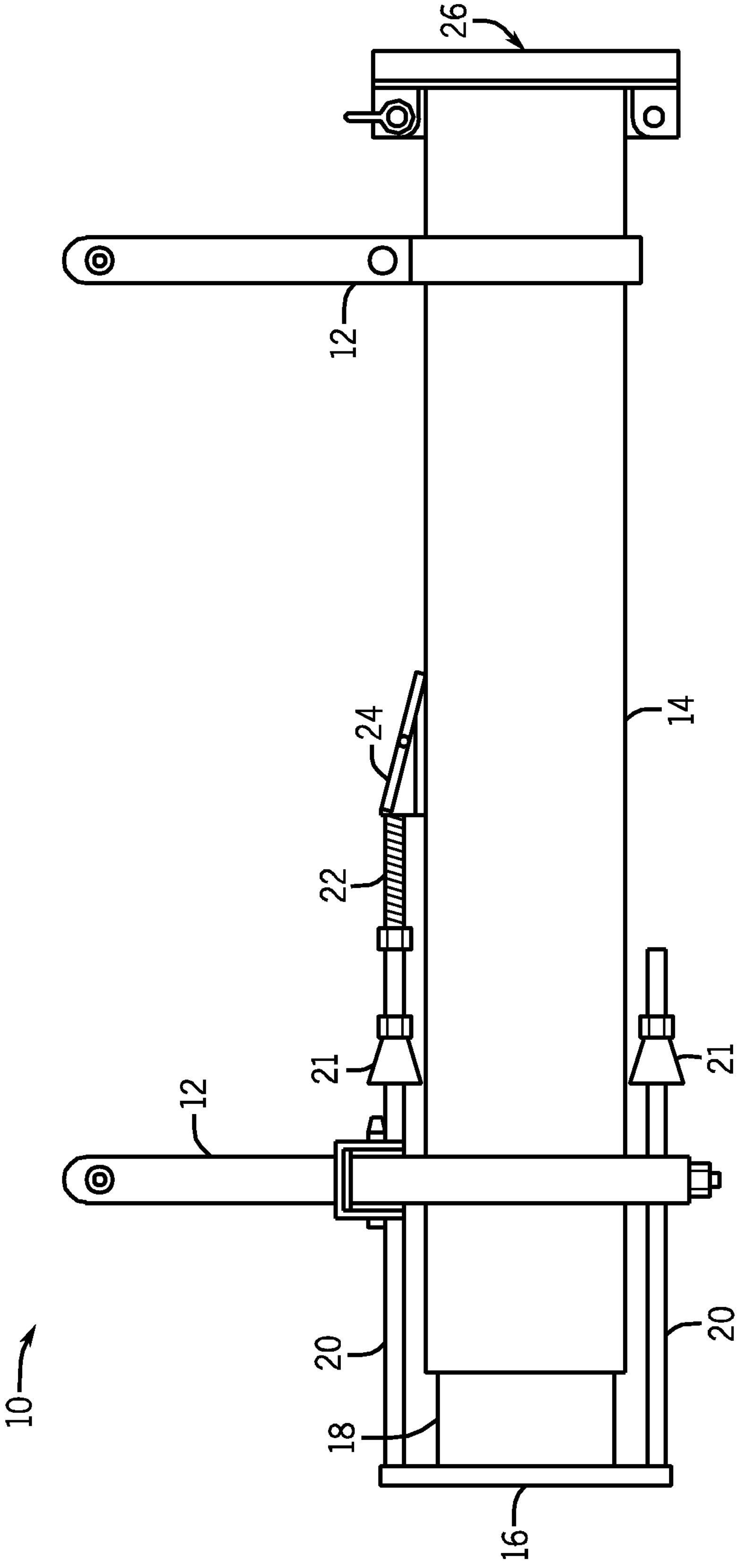
FIG. 1 illustrates a side view of the battering ram according to an exemplary embodiment of the present invention.

FIG. 1 shows a battering ram 10 according to an exemplary embodiment of the present invention. The battering ram 10 may include a hollow casing 14, a bolt piston housing 18 sliding inside the front end hollow casing 14, a front plate 16 connected to the front end of the bolt piston housing 18, and a back plate assembly 26 connected to the back end of the hollow casing 14.

The hollow casing 14 may be made of a sturdy material. In some embodiments, the hollow casing 14 may be made of metal, fire resistant plastic, composite, or fire resistant resin. The size of the hollow casing 14 may depend on the size of the bolt piston housing 18. In some embodiments, the length of the hollow casing 14 may be between 2 to 3 inches.

The face plate 16 may be designed to physically strike the locked door. The face plate 16 may have a geometrical shape. In some embodiments, the shape of the front plate 16 may be round, triangular, square, rectangular, pentagonal, hexagonal, or polygonal. In some embodiments, the front plate 16 may be round with a diameter between 5 to 12 inches. The thickness of the front plate 16 may depend on the type of door to be struck. In some embodiments, the thickness of the front plate 16 may be between ¼ to 1 inch.

The bolt piston housing 18 may slide inside the hollow casing 14. The bolt piston housing 18 may be connected to the hollow casing 14 by the retention rods 20. The retention rods 20 may allow the bolt piston housing 18 to move backward and forward. The retention rods 20 may be mounted to the outside of the hollow casing 14. The front end of the retention rods 20 may be attached to the front plate 16. The back end of the retention rods 20 may be secured to the hollow casing 14 by using a rubber stopper 21 placed on the retention rod 20. The number of retention rods 20 may depend on the size of the battering ram 10. The retention pin 24 may be disengaged from the hollow casing 14 just prior to firing the battering ram 10.

In some embodiments, the bolt piston housing 18 may be attached to the hollow casing 14 by a ring (not shown) protruding from the outside at the end of the bolt piston housing 18. In the same embodiment, the front face of the hollow casing 14 may be reduced to secure the ring (not shown) on the bolt piston housing 18.

Handles 12 may allow the user to manipulate the battering ram 10. The handles 12 may be attached to the outer side of the hollow casing 14. In some embodiments, the handles 12 may be bolted on or welded on to the outer side of the hollow casing 14.

Figure 2:
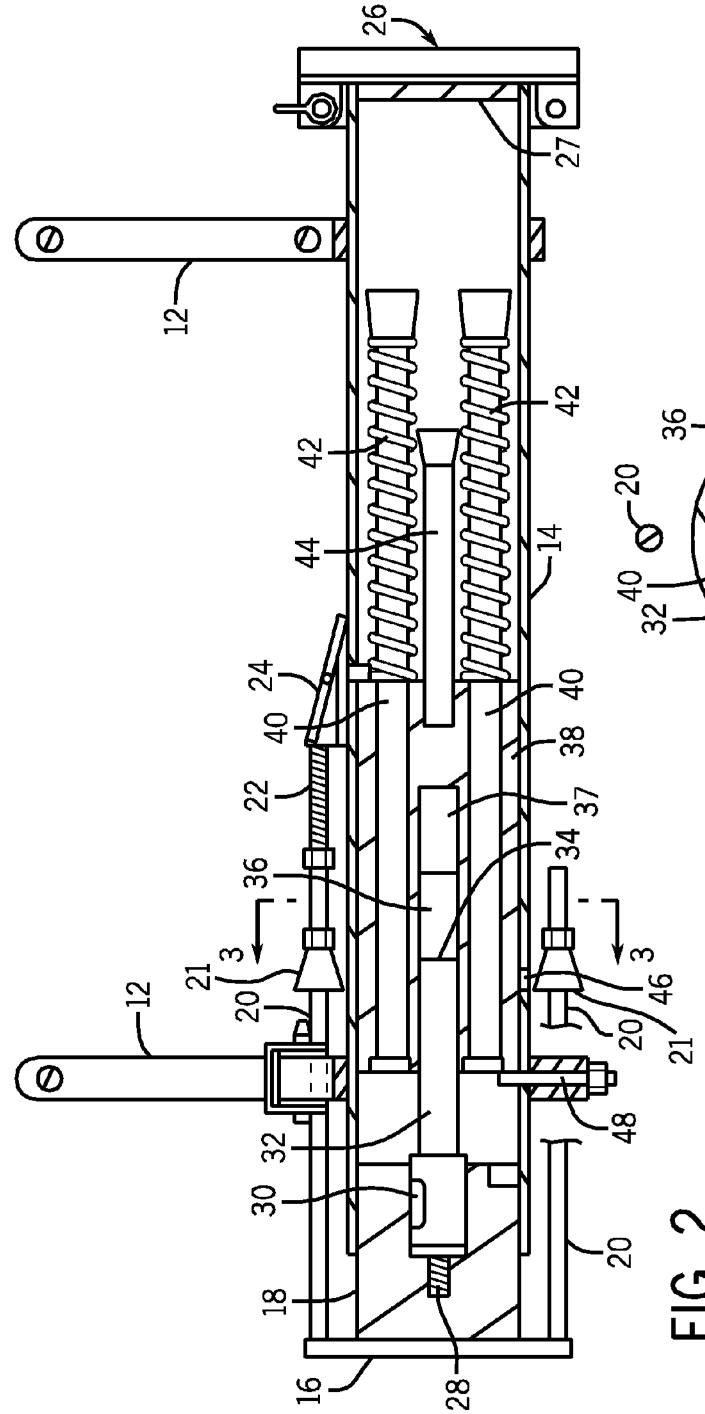
FIG. 2 illustrates a longitudinal cross-sectional view of the battering ram of FIG. 1.
Figure 3:
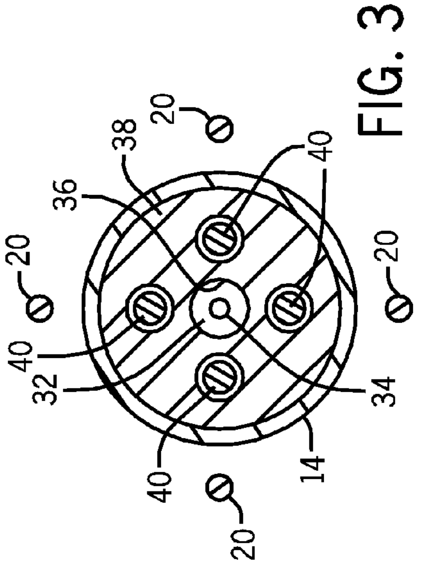
FIG. 3 illustrates a cross-sectional view taken along line 3-3 of FIG. 2.

FIG. 2 illustrates that the hollow casing 14 may encase the bolt piston housing 18 and a chamber piston 38. The bolt piston housing 18 and the chamber piston 38 may slide back and forth inside the hollow casing 14. The bolt piston housing 18 may connect a bolt 32 with the front plate 16. The size of the bolt piston housing 18 may depend on the size of the front plate 16 and the size of the hollow casing 14. In some embodiments, the bolt piston housing 18 may have a length between 1 to 6 inches and a diameter between 2 to 6 inches.

The bolt retention pin 30 may slide through the bolt piston housing 18. The bolt retention pin 30 may connect the bolt piston housing 18 and the bolt 32 together. A bolt timing spring 28 may be connected to the bolt 32. The bolt timing spring 28 may help keep the bolt 32 in an extended position until the time of the firing. A chamber 36 may house an explosive casing 37. In some embodiments, the battering ram 10 may include at least two chambers 36. A firing pin 34 may be designed to strike against the explosive casing 37. The size of the firing pin 34 may depend on the size of the explosive casing 37. In some embodiments, the length and diameter of the firing pin 34 may be between 1/16 to 1/8 inches.

The chamber piston 38 may house the explosive casing 37. The size of the chamber piston 38 may depend on the size of the bolt piston housing 18. In some embodiments, the size of the chamber piston 38 may be equal to the size of the bolt housing 18.

The bolt 32 may be pushed by the gases that may be produced during an explosion that may occur as a result of the firing pin 34 being pushed into the primer on the explosive casing 37. This action may be caused by the battering ram 10 being swung into a door, causing the front plate 16 to push the bolt housing piston 18 and the bolt 32. This may force the bolt 32 to slide down the chamber 36 until the firing pin 34 makes contact with the primer on the explosive casing 37. A bolt retention pin 30 may connect the bolt piston housing 18 and the bolt 32. The bolt retention pin 30 may allow the bolt 32 to slide back and forth without detaching from the bolt piston housing 18. The size of the bolt 32 may depend on the size of an explosive casing 37. In some embodiments, the length of the bolt 32 may be between 3 to 8 inches. In some embodiments, the diameter of the bolt 32 may be equal to that or slightly greater than the explosive casing 37.

The explosive casing 37 may be any commercially available explosive casing. In some embodiments, the explosive casing 37 may be a 0.50 Browning Machine gun (BMG) cartridge cut down to 1.91 inches.

The back plate 27 may be connected to the back end of the hollow casing 14. The back plate 27 may be opened for reloading the battering ram 10. In some embodiments, the back plate 27 may be hinged to the back end of the hollow casing 14. In some embodiments, the back plate 27 may be a cap threaded directly onto the hollow casing 14.

A stopper pin 48 may be placed before the chamber piston 38 to stop the chamber piston 38 from moving forward passing the stopper pin 48. The stopper pin 48 which may be bolted on or welded onto the outer side of the hollow casing 14.

Buffer spring guide rods 40 may run through the chamber piston 38 and may be connected to the buffer springs 42. The buffer spring 42 may be attached to the back of the chamber piston 38 and cushions the recoil after firing. The buffer spring guide rods 40 may hold the buffer spring 42 in place, preventing them from bending. The number of buffer springs 42 may depend on the number of spring guide rods 40. A stopper bar 44 may be attached to the back of the chamber piston 38. The stopper bar 44 may prevent the buffer springs 42 from failing.

The exhaust port 46 may allow for the gases produced by the firing to vent out of the battering ram 10. The size of the exhaust port 46 may depend on the size of the battering ram 10. In some embodiments, the diameter of the exhaust port may be ½ inches.

The bolt timing spring 28 may be located at the base of the bolt 32 inside the bolt piston housing 18 to keep the bolt 32 in an extended position. Having the bolt 32 in the extended position may facilitate igniting the explosive casing 37 just prior to the bolt piston housing 18 and the chamber piston 38 making contact.

The user may open the hollow casing 14 then load the explosive casing 37 into the chamber 36 by opening the back plate 14 and removing the chamber piston 38. In some embodiments, the battering ram 10 may be loaded by an opening (not shown) between the chamber piston 38 and the bolt piston 18. Once loaded and all openings for loading have been closed, the user may position the bolt piston housing facing forward and the chamber piston 38 against the stopper pin 48. Then, the user may check that the retention pin 24 may be holding the chamber piston 38 in place. The user may carry the battering ram 10 by the handles to the locked door. The user may swing the battering ram 10 against the door so that the face plate 16 may strike on the side of the door that has the locking mechanism or the side that has the hinges. When the user strikes the door with the battering ram 10, the front plate 16 makes contact with the door pushing the bolt piston housing 18 towards the chamber piston 38. Simultaneously, the retention pin timing spring 22 may push against the retention pin 24 withdrawing the retention pin 24 from inside the hollow casing 14. This action may allow the chamber piston 38 to move backwards after firing which may be important for recoil management. As the bolt piston housing 18 may be pushed further into the hollow casing 14, the bolt 32 may slide down the chamber 36 until the firing pin 34, on the face of the bolt 32, may be pushed into the explosive casing 37. The bolt 32 may be held in an extended position by the bolt timing spring 28 prior to the chamber piston making contact with the bolt piston housing 18. The gun powder may be ignited by the firing pin 34. The gun powder may rapidly burn, turning from a solid state into a gas state. The expanding gas then pushes against the bolt 32 compressing the bolt timing spring 28 until the pressure may be dispersed onto the bolt piston housing 18 applying a lot of pressure against the door pushing it open. The pressure may be derived from the transfer of energy resulting in the forward movement of the chamber piston 38, movement coming to an abrupt stop and then rapidly being propelled back down the hollow casing 14 by the gases from the gun powder. The backward movement of the chamber piston 38 may be stopped when the buffer spring(s) 42 make contact with the back plate 27 gradually slowing down the chamber piston 38, and reducing the recoil felt by the user.

In some embodiments, the bolt 32 may be attached to the chamber piston 38 to slide in and out of the chamber 36 pushing against the bolt piston housing 18. In some embodiments, the chamber piston 38 may be attached directly to the hollow casing 14 making it immovable. In some embodiments, the explosive casing 37 may be inserted into the bolt piston housing 18. In some embodiments, the buffer spring(s) 42 may be attached to the back plate 27 instead of the chamber piston 38. In some embodiments, the back of the hollow housing 14 may be sealed and the buffer springs 42 may not be required.

The battering ram 10 may be used to knock holes in the walls of a structure, move heavy objects short distances, or as a spike or post driver.

It should be understood, of course, that the foregoing relates to exemplary embodiments of the invention and that modifications may be made without departing from the spirit and scope of the invention as set forth in the following claims.

What is claimed is:

1. A ballistic battering ram comprising:

a hollow casing having a front end, a back end, an outer side, and an inner side;

a bolt piston housing sliding inside the front end hollow casing, the bolt piston housing including a front end and a back end;

a front plate connected to the front end of the bolt piston housing;

a back plate connected to the back end of the hollow casing;

a first and second handle attached to the outer side of the hollow casing;

a chamber piston placed inside of the hollow casing, a bolt retention pin placed inside the bolt piston housing, the bolt retention pin having a first side and a second side;

a bolt connected to the first side of the bolt retention pin;

a bolt timing spring connected to the second side of the bolt retention pin;

an explosive casing connected to the bolt, wherein the explosive casing is adapted to receive gun powder; and a firing pin connected to the bolt configured to trigger an explosion of the gun powder and propel the chamber piston toward the front plate.

2. The battering ram device according to claim 1, further including retention rods to connect the bolt piston housing to the hollow casing, wherein the retention rods include a first end and a second end.

3. The battering ram device according to claim 2, wherein the retention rods are mounted to the outer side of the hollow casing.

4. The battering ram device according to claim 2, wherein the first end of each retention rod is attached to the front plate and wherein the second end of each retention rod is secured to the hollow casing.

5. The battering ram device according to claim 1, further including a stopper pin placed between the chamber piston and the bolt piston housing, wherein the stopper pin stops the chamber piston from moving forward and passing the stopper pin.

6. The battering ram device according to claim 1, further including buffer spring guide rods connected to the chamber piston and buffer springs placed on the buffer spring guide rods to cushion a recoil after the explosion.

7. The battering ram device according to claim 1, further including a plurality of exhaust ports located on the hollow casing, wherein the plurality of exhaust ports allow for gases produced by the explosion to vent out of the hollow housing.

8. The battering ram device according to claim 3, further including a retention pin mounted to the outer side of the hollow casing, a retention pin timing spring operatively connected to one end of the retention pin, and a rubber stopper placed on the retention rod.

* * * * *